United States Patent
Benson et al.

(10) Patent No.: US 10,923,888 B2
(45) Date of Patent: Feb. 16, 2021

(54) INTERCHANGEABLE SWITCHGEAR MODULES AND RELATED SYSTEMS

(71) Applicant: Eaton Intelligent Power Limited, Dublin (IE)

(72) Inventors: Bryan Richard Benson, Chappells, SC (US); Michael Patrick Culhane, Delafield, WI (US); Marten Binnendijk, Hengelo (NL); David Allan Aho, Waukesha, WI (US); Brent David Henry, Arden, NC (US); David Glenn Woolard, Mauldin, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/917,986

(22) Filed: Mar. 12, 2018

(65) Prior Publication Data
US 2019/0280466 A1 Sep. 12, 2019

(51) Int. Cl.
| H02B 1/48 | (2006.01) |
| H02B 1/20 | (2006.01) |
| H02B 11/02 | (2006.01) |
| H02B 13/035 | (2006.01) |

(52) U.S. Cl.
CPC .............. *H02B 1/48* (2013.01); *H02B 1/20* (2013.01); *H02B 11/02* (2013.01); *H02B 13/0358* (2013.01)

(58) Field of Classification Search
None
See application file for complete search history.

(56) References Cited

U.S. PATENT DOCUMENTS

| 7,307,227 | B2* | 12/2007 | Buettner ............... H01H 71/08 200/51.11 |
| 2005/0219804 | A1* | 10/2005 | Arioka ............... H02B 13/035 361/612 |
| 2009/0316339 | A1 | 12/2009 | Jung |
| 2010/0128417 | A1 | 5/2010 | Ichinomiya |

(Continued)

FOREIGN PATENT DOCUMENTS

| DE | 41 26 786 A1 | 2/1993 |
| DE | 10 2014 104 541 A1 | 10/2015 |

(Continued)

OTHER PUBLICATIONS

"ZX-Family Gas-insulated medium voltage switchgear," ABB AG, www.abb.com/mediumvoltage, 2009, 6 pages.

(Continued)

*Primary Examiner* — Courtney L Smith
(74) *Attorney, Agent, or Firm* — Stanek Lemon Crouse & Meeks PA

(57) ABSTRACT

Modular switchgear systems are provided including at least two separate modules including components of switchgear. The at least two separate modules are independent of one another. One of the at least two separate modules is a stationary module and remaining ones of the at least two separate modules are removable such that the remaining ones of the at least two separate modules are configured to engage and/or disengage easily from the stationary module and an electrical power system. Related removable modules are also provided.

15 Claims, 5 Drawing Sheets

(56) References Cited

U.S. PATENT DOCUMENTS

| | | | | |
|---|---|---|---|---|
| 2010/0178797 A1* | 7/2010 | Byrne | H05K 5/03 |
| | | | 439/540.1 |
| 2011/0299226 A1* | 12/2011 | Milovac | H02B 11/00 |
| | | | 361/605 |
| 2011/0299228 A1* | 12/2011 | Milovac | H02B 11/26 |
| | | | 361/614 |
| 2012/0087051 A1* | 4/2012 | Spitaels | H01R 13/6666 |
| | | | 361/63 |
| 2013/0050905 A1 | 2/2013 | Kim | |
| 2013/0170104 A1 | 7/2013 | Kim | |
| 2015/0030889 A1* | 1/2015 | Kawaguchi | H01M 2/1077 |
| | | | 429/7 |
| 2015/0357774 A1* | 12/2015 | Ren | H01R 25/162 |
| | | | 439/110 |
| 2016/0172826 A1* | 6/2016 | Ren | H02B 11/02 |
| | | | 361/608 |
| 2016/0198592 A1* | 7/2016 | Schmitt | H05K 7/20745 |
| | | | 361/679.46 |
| 2018/0070475 A1* | 3/2018 | Ross | H05K 7/20727 |
| 2018/0083426 A1* | 3/2018 | Ali | H02B 1/36 |
| 2018/0090913 A1* | 3/2018 | Johnson | H01H 33/66 |
| 2018/0366923 A1 | 12/2018 | Yanniello | |
| 2018/0366924 A1* | 12/2018 | Yanniello | H02B 13/0358 |
| 2019/0280466 A1 | 9/2019 | Benson et al. | |

FOREIGN PATENT DOCUMENTS

| | | |
|---|---|---|
| EP | 1 107 408 A1 | 6/2001 |
| JP | H07123541 A | 5/1995 |
| KR | 10-2013-0000620 A | 1/2013 |

OTHER PUBLICATIONS

Notification of Transmittal of the International Search Report and the Written Opinion of the International Searching Authority, dated Mar. 25, 2019, 16 pages.

* cited by examiner

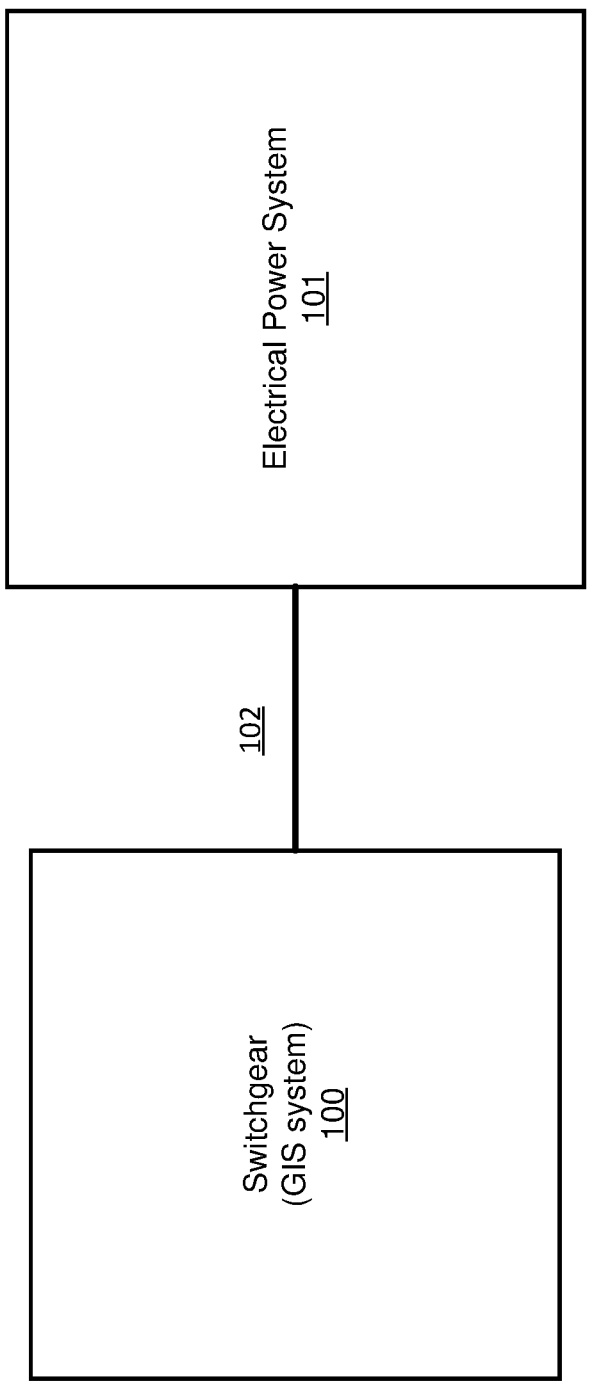

INTERCHANGEABLE SWITCHGEAR MODULES AND RELATED SYSTEMS

FIELD

The inventive concept relates generally to power devices and, more particularly, to switchgear.

BACKGROUND

In an electric power system, switchgear is the combination of, for example, electrical disconnect switches, fuses or circuit breakers used to control, protect and isolate electrical equipment. Switchgear can be used both to de-energize equipment to allow work to be done and to clear faults downstream. There are different types of switchgear.

In particular, switchgear may be a simple open-air isolator switch or it may be insulated by some other substance. For example, two types of switchgear are air-insulated switchgear (AIS) and gas-insulated switchgear (GIS). AIS are generally favorably priced high-voltage substations and may be rated for voltages of up to 800 kV. An effective although more costly alternative form of switchgear is the gas-insulated switchgear (GIS), where the conductors and contacts are insulated by pressurized gas, for example, sulfur hexafluoride gas ($SF_6$). Gas-insulated switchgear (GIS) generally handles very high voltages, for example, from 72.5 kV to 1200 kV. Gas-insulated high-voltage switchgear (GIS) is a compact metal encapsulated switchgear consisting of high-voltage components such as circuit-breakers and disconnectors, which can be safely operated in confined spaces.

Other common types of switchgear are oil or vacuum insulated switchgear. The combination of equipment within the switchgear enclosure allows them to interrupt fault currents of thousands of amps. No matter the kind of switchgear, it is relatively expensive equipment and when it breaks, it can be very costly to replace or repair.

BRIEF DESCRIPTION OF THE DRAWINGS

FIG. 5 is a diagram illustrating a system including a GIS system and electrical power system in accordance with some embodiments of the present inventive concept.

SUMMARY

Figure 1:
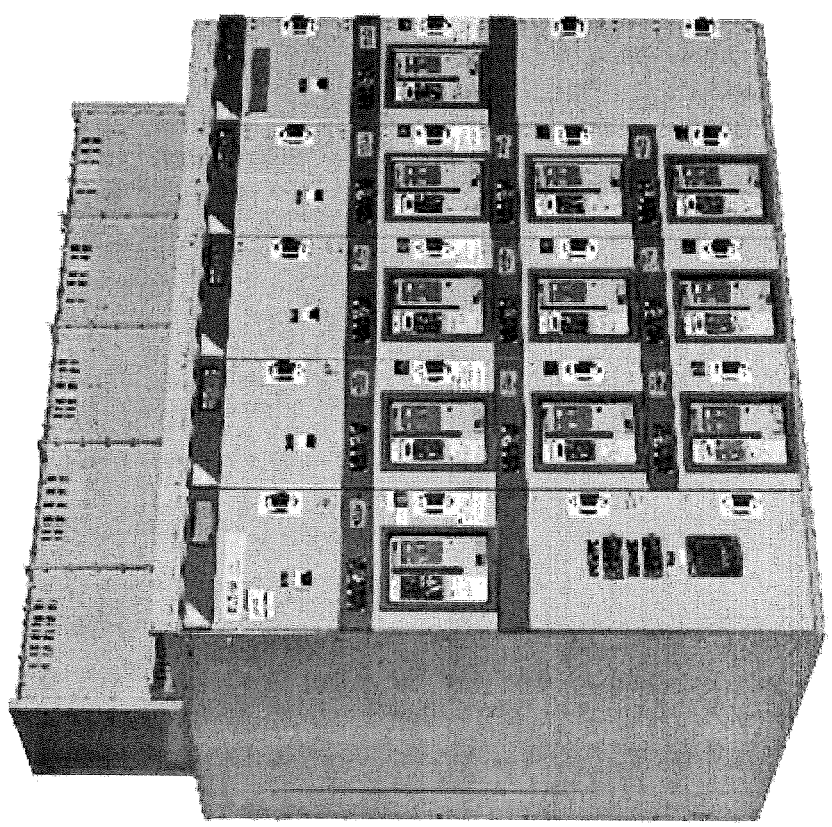
FIG. 1 is a diagram illustrating a low voltage switchgear.

Some embodiments of the present inventive concept provide modular switchgear systems including at least two separate modules including components of switchgear. The at least two separate modules are independent of one another. One of the at least two separate modules is a stationary module and remaining ones of the at least two separate modules are removable such that the remaining ones of the at least two separate modules are configured to engage and/or disengage easily from the stationary module and an electrical power system.

In further embodiments, the modular switchgear system may be one of a gas-insulated switchgear (GIS) system and an air-insulated switchgear (AIS) system.

In still further embodiments, any one of the at least two separate modules may be configured to be replaced in the system without replacement of remaining ones of the at least two separate modules.

In some embodiments, the modular switchgear system may include a gas-insulated switchgear (GIS) and the at least two separate modules may include a low-voltage unit, a main bus unit, a mechanism unit, a current transformer unit, a voltage transformer unit and/or a cabling unit. The low-voltage unit, the main bus unit, the mechanism unit, the current transformer unit, the voltage transformer unit and/or the cabling unit may be combined into the at least two modules. Each of the low-voltage unit, the main bus unit, the mechanism unit, the current transformer unit, the voltage transformer unit and/or the cabling unit may be a separate module in the GIS system.

In further embodiments, the at least two separate modules may include a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, a three-position disconnector operating mechanism and a cable connector.

In still further embodiments, the gas tank for the insulating gas may include one of a 1250 A single gas tank, a 2500 A single gas tank, and a 1250 A bus sectionalizer gas tank.

In some embodiments, the VTs may include one of a fused VT and a non-fused VT.

In further embodiments, the CTs may include single phase, ring-type CTs.

Still further embodiments of the present inventive concept provide a removable module for use in a modular switchgear system, the removable module is configured to engage and/or disengage easily from a stationary module of the modular switchgear system and an electrical power system. The removable module and the stationary module include components of switchgear and are independent of one another.

DETAILED DESCRIPTION

Specific exemplary embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, switchgear, for example, air-insulated switchgear (AIS) and gas-insulated switchgear (GIS), is the combination of, for example, electrical disconnect switches, fuses or circuit breakers used to control, protect and isolate electrical equipment. Switchgear can be used both to de-energize equipment to allow work to be done and to clear faults downstream. AIS generally handles lower voltages and GIS generally handles very high voltages, for example, from 72.5 kV to 1200 kV. However, the voltages may vary depending on the system. Switchgear generally consists of a housing, usually a compact metal housing, including components, such as circuit-breaker and disconnectors, which can be safely operated in confined spaces. An example of Eaton's arc-resistant low voltage (LV) switchgear is illustrated in FIG. 1.

When the switchgear malfunctions or completely fails, the switchgear must be taken offline to fix or replace. Repairing or replacing a whole system can be very expensive. Accordingly, some embodiments of the present inventive concept provide modular components, for example, breakers, auxiliaries, transformers and the like, that can be removed and replaced relatively quickly. Thus reducing the cost of the system repair and downtime of the switchgear.

Furthermore, providing the switchgear in modules may allow the switchgear to be shipped separately. For example, when customers order switchgear, they generally have tight schedules for completion and delays can cost significant additional expense and/or opportunity cost. GIS systems can take more than twice the amount of time to install compared to air insulated switchgear (AIS). Components that are more easily manufactured may be shipped first and be set up while the other components are still being manufactured. The more complicated modules may then be plugged in to the prior shipped modules allowing customers to meet the set timeline.

As will be discussed further below with respect to the FIGS. 2 through 4, manufacture of the modules of the present inventive concept may be similar to traditional manufacture, but may be split into two or more modules that can be easily swapped and replaced. The switchgear can be split into as many or as few as two modules without departing from the scope of the present inventive concept. For example, individual modules may include a low-voltage module, a main bus module, a mechanism module, current transformer (CT)/voltage transformer (VT) modules and the like.

It will be understood that embodiments of the present inventive concept will be discussed herein with respect to a specific number and type of modules, however, embodiments of the present inventive concept are not limited to this configuration. Modules discussed herein may be combined or separated into multiple modules without departing from the scope of the present inventive concept.

Figure 2:
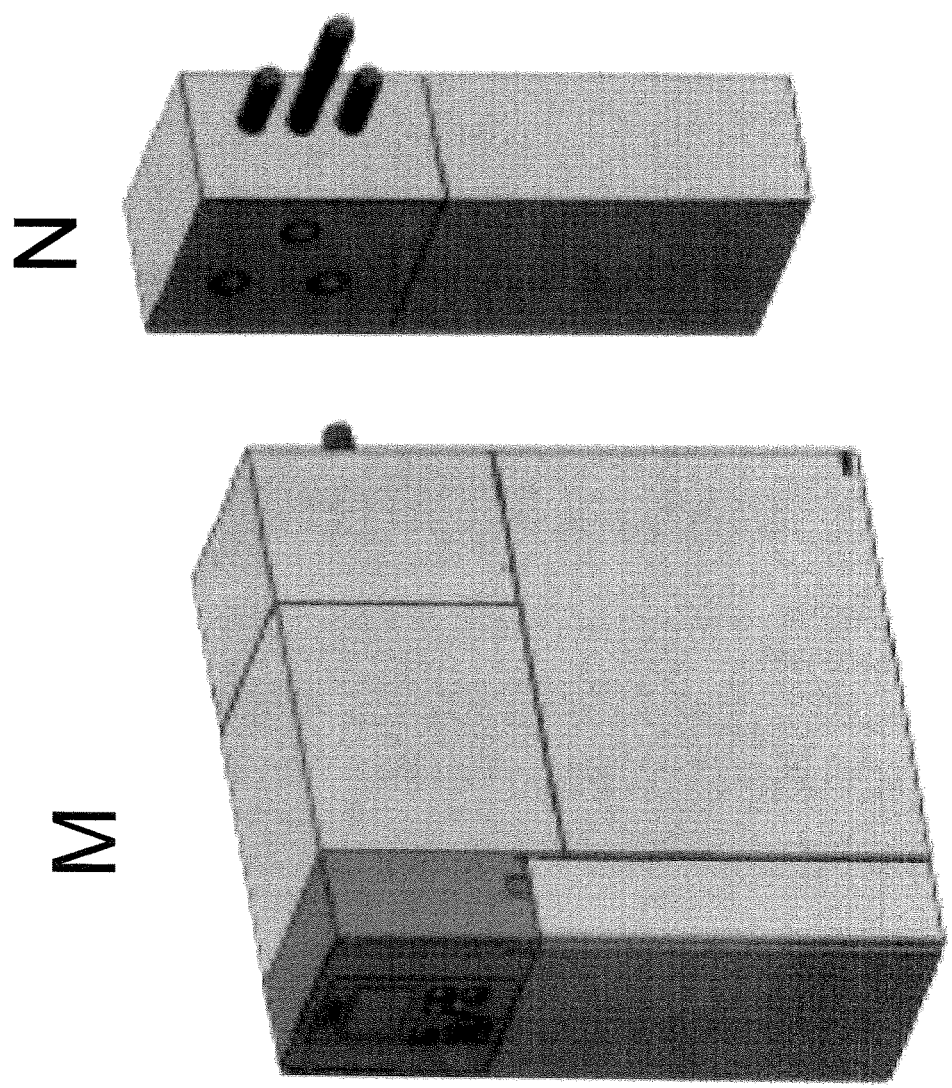
FIG. 2 is a diagram of a modular switchgear system in accordance with some embodiments of the present inventive concept.

Referring first to FIG. 2, a modular switchgear system in accordance with embodiments of the present inventive concept will be discussed. As illustrated in FIG. 2, the switchgear 190 may be split into two modules M and N that are configured to couple and decouple using any number of types of connectors. For example, some embodiments may be engaged and disengaged using connectors and systems discussed in commonly, assigned U.S. patent application Ser. No. 15/624,972, filed on Jun. 16, 2017, the disclosure of which is hereby incorporated herein by reference as if set forth in its entirety. In some embodiments, one of the modules may be a stationary section that is coupled to the bus and electrical system and is not intended to be switched out and the remaining modules may be configured to be removable such that these removable modules are easily engaged and disengaged with the stationary module as well as each other. As used herein, "stationary" refers to a module that is not easily plugged into and out of the switchgear system. For example, the stationary module may be hard wired to the bus. Similarly as used herein, "removable" refers to a module or component that is easily plugged and/or unplugged from the stationary module and/or an electric power system 101.

In embodiments illustrated in FIG. 2, the stationary module may be provided by the N portion of the FIG. 2 and may include components related to the main bus. The removable module may be provided by the M portion of FIG. 2 and may include, for example, breakers, voltage transformers (VTs), current transformers (CTs), auxiliaries and the like.

Figures 3A, 3B:
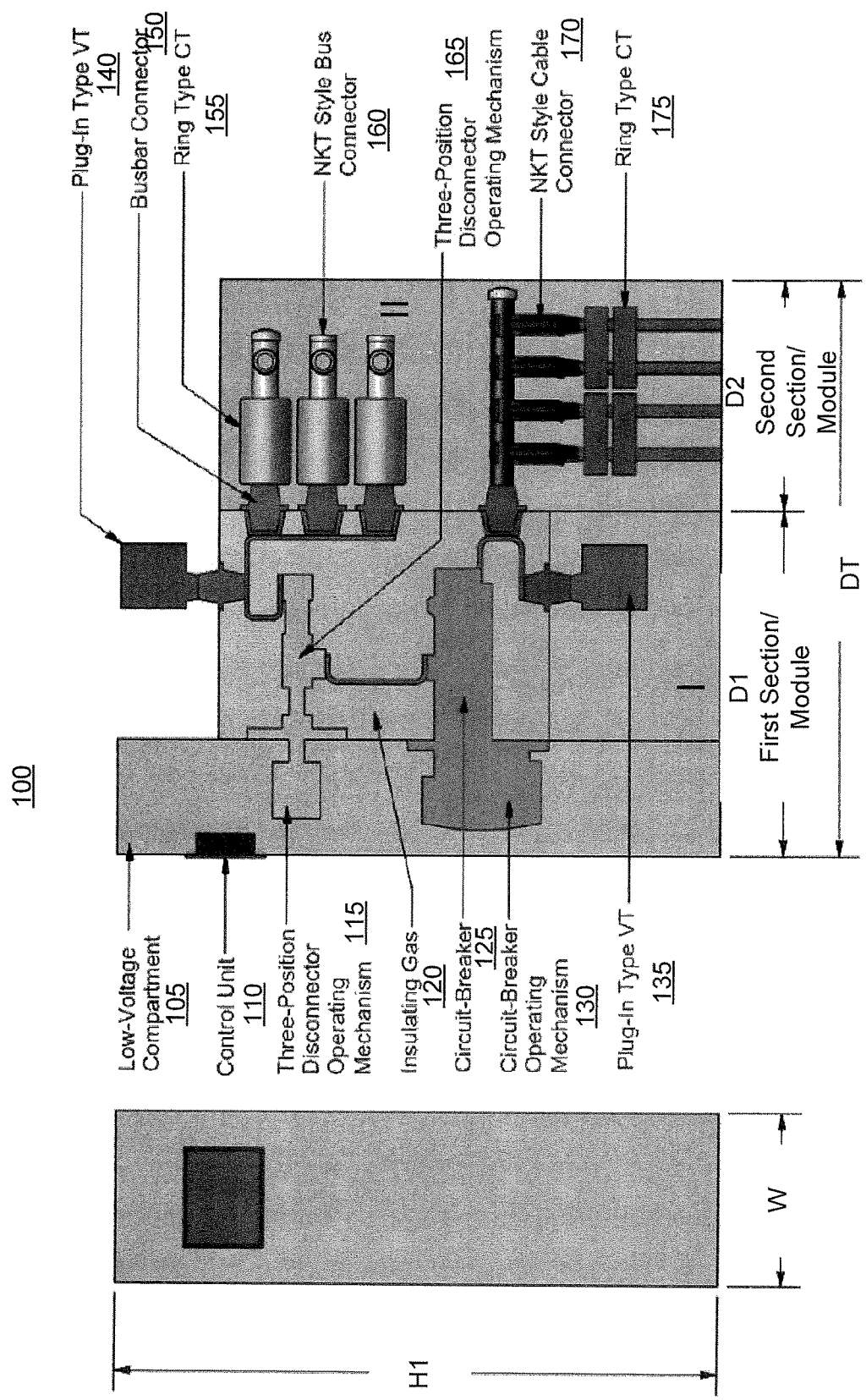
FIG. 3A is a diagram of a front view of an example GIS switchgear enclosure in accordance with various embodiments of the present inventive concept.
FIG. 3B is a diagram illustrating a side view of an example GIS system in accordance with some embodiments of the present inventive concept.

Modular GIS will now be discussed as an example of embodiments of the present inventive concept. It will be understood that embodiments of the present inventive concept are not limited to GIS and can be AIS or other type of switchgear without departing from the scope of the present inventive concept. Referring now to FIG. 3A, a diagram of a front view of a switchgear in accordance with some embodiments of the present inventive concept will be discussed. As illustrated in FIG. 3A, the housing for the GIS may have a height H1 and a width W1. The dimensions of the housing may vary depending on the customer and the specifications associated therewith.

As illustrated in the side view of the switchgear 100 in FIG. 3B, the switchgear has a total depth of DT, a first section (I) having a first depth D1 and a second section (II) having a second depth D2 and a second height H2. In some embodiments, the first section II may be a removable section and the second section II may be a stationary section, however, embodiments of the present inventive concept are not limited to this configuration. Furthermore, the two sections may be broken into more sections/modules without departing from the scope of the present inventive concept. Again, the dimensions of the various portions of the modular system may vary depending on the customer and the specifications associated therewith.

As further illustrated in FIG. 3B, the switchgear 100 may be divided into two modules I and II. As discussed above, the modular GIS discussed herein may be provided in two or more modules without departing from the scope of the present inventive concept. For example, each of the various functions may be provided in their own module housing. These modules may include, but are not limited to a cabling module, a low-voltage module, a main bus module, a mechanism module, current transformer (CT)/voltage transformer (VT) modules and the like.

Figure 4:
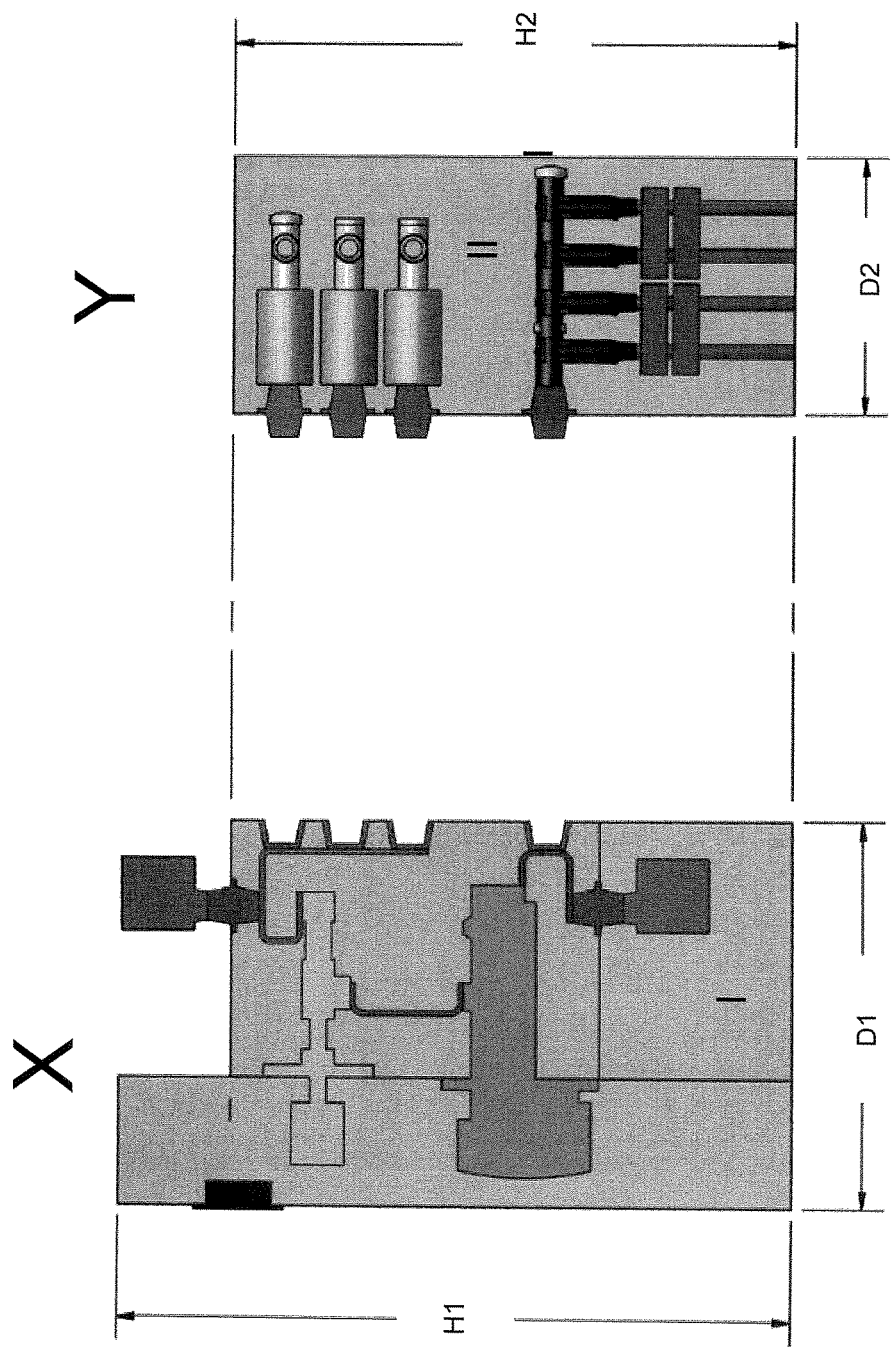
FIG. 4 is a diagram illustrating two separate sections of a modular switchgear system in accordance with some embodiments of the present inventive concept.

As illustrated in FIG. 4, the first and second modules I and II, respectively, are configured to fit together and can be assembled by the modules, much like building blocks or Legos. In embodiments of the present inventive concept illustrated in FIG. 4, the second module II is stationary and the first module I is removable. As further illustrated in FIG. 4, the second module II includes much of the cabling required to connect the GIS to the electric power system 101. When a portion of the GIS needs repair, modular systems allow only the damaged portions of the GIS to be replaced, which saves time and cost for the customer.

Referring again to FIG. 3B, a modular GIS 100 in accordance with some embodiments of the present inventive concept includes a low-voltage compartment 105, a control unit 110, a three-position disconnector operating mechanism 115, an insulating gas in a gas tank 120, a circuit breaker 125, a circuit breaker operating mechanism 130, plug-in type VTs 135, 140, bus bar connectors 150, a ring type CTs 155, 175, a bus connector 160, a three-position disconnector operating mechanism 165, and a cable connector 170. In some embodiments, the bus connector 160 and the cable connector 170 may be provided by an NKY style connector without departing from the scope of the present inventive concept.

It will be understood that the components of the GIS of FIG. 3B are provided for example only. Many of these mechanisms, devices and connectors may be replaced by equivalent items without departing from the scope of the present inventive concept. The gas tank 120 may be, for example, a 1250 A single gas tank, a 2500 A single gas tank, or a 1250 A bus sectionalizer gas tank without departing from the scope of the present inventive concept. The gas may be, for example, sulfur hexafluoride ($SF_6$), but is not limited thereto. Similarly, the VTs may be, for example, a fused VT or a non-fused VT. VTs may be located at a top portion of the GIS, a bottom portion of the GIS or in a remote location without departing from the scope of the present inventive concept. In some embodiments, the VTs may be 36 kV class VTs with a frequency of 50-50 Hz. Finally, the CTs may be, for example, single phase, ring-type CTs. The CTs utilized will meet applicable IEC, IEEE and NEMA standards.

As discussed above, although the example discussed herein relates to GIS embodiments, the present inventive concept is not limited thereto. The modular concept can be applied to AIS and other switchgear without departing from the scope of the present inventive concept.

As briefly discussed above, some embodiments of the present inventive concept provide switchgear inn separate and distinct modules allowing these modules removed and installed separately. Providing the various portions of the switchgear in modules may allow a reduction in down time when repairs are needed and, therefore, a reduction in cost for the customer.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A modular switchgear system, the system comprising:
   at least two separate modules including components of the modular switchgear, the at least two separate modules being independent of one another, one of the at least two separate modules being a stationary module and at least one remaining module of the at least two separate modules being removable such that the at least one remaining module of the at least two separate modules is configured to engage and disengage easily from the stationary module and an electrical power system,
   wherein the stationary module and/or the at least one remaining module of the at least two separate modules comprise a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, and a cable connector,
   wherein the VTs comprise a non-fused VT.

2. The system of claim 1, wherein the modular switchgear system is one of a gas-insulated switchgear (GIS) system and an air-insulated switchgear (AIS) system.

3. The system of claim 1, wherein any one of the at least two separate modules is configured to be replaced in the system without replacement of the at least one remaining module of the at least two separate modules.

4. The system of claim 1, wherein the modular switchgear system comprises a gas-insulated switchgear (GIS) and wherein the at least two separate modules comprise a low-voltage unit, a main bus unit, a mechanism unit, a current transformer unit, a voltage transformer unit and/or a cabling unit including the cabling to connect the modular switchgear to the electrical power system.

5. The system of claim 4, wherein the low-voltage unit, the main bus unit, the mechanism unit, the current transformer unit, the voltage transformer unit and the cabling unit are combined into the at least two modules.

6. A modular switchgear system, the system comprising:
   at least two separate modules including components of the modular switchgear, the at least two separate modules being independent of one another, one of the at least two separate modules being a stationary module and at least one remaining module of the at least two separate modules being removable such that the at least one remaining module of the at least two separate modules are configured to engage and/or disengage easily from the stationary module and an electrical power system,
   wherein the components of the switchgear comprise a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, and a cable connector,
   wherein the VTs comprise non-fused VTs.

7. The system of claim 6, wherein the gas tank for the insulating gas comprises one of a 1250 A single gas tank, a 2500 A single gas tank, and a 1250 A bus sectionalizer gas tank.

8. The system of claim 6, wherein the CTs comprise single phase, ring-type CTs.

9. A removable module for use in a modular switchgear system, the removable module being configured to engage and/or disengage easily from a stationary module of the modular switchgear system and an electrical power system,
   wherein the removable module and the stationary module include components of the modular switchgear;
   wherein when the removable module and the stationary module are engaged, the removeable module and the stationary module function as a complete modular switchgear system;

wherein when the removeable module and the stationary module are disengaged, each of the removable module and the stationary module include independent components of the modular switchgear system; and wherein the removable module and/or the stationary module comprise a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, and a cable connector.

10. The removable module of claim 9, wherein the modular switchgear system is one of a gas-insulated switchgear (GIS) system and an air-insulated switchgear (AIS) system.

11. The removable module of claim 9:
wherein the removable module comprises one of a plurality of removable modules;
wherein each of the plurality of removable modules is configured to engage and/or disengage easily from the stationary module of the modular switchgear system; and
wherein any one of the plurality of removable modules are configured to be replaced in the system without replacement of the at least one remaining module of the plurality of removable modules.

12. The removable module of claim 9, wherein the modular switchgear system comprises a gas-insulated switchgear (GIS) and wherein the removable module and the stationary module comprise a low-voltage unit, a main bus unit, a mechanism unit, a current transformer unit, a voltage transformer unit and/or a cabling unit including the cabling to connect modular switchgear to the electrical power system.

13. The removable module of claim 12, wherein the low-voltage unit, the main bus unit, the mechanism unit, the current transformer unit, the voltage transformer unit and the cabling unit are combined into the removable module and the stationary module.

14. The removable module of claim 1, wherein the gas tank for the insulating gas comprises one of a 1250 A single gas tank, a 2500 A single gas tank, and a 1250 A bus sectionalizer gas tank.

15. The removable module of claim 1, wherein the CTs comprise single phase, ring-type CTs.

* * * * *